United States Patent [19]

Meini et al.

[11] Patent Number: 4,997,077
[45] Date of Patent: Mar. 5, 1991

[54] METHOD AND APPARATUS FOR THE POSITIONING OF SLABS

[75] Inventors: Bruno Meini; Alessandro Fabbrini; Giovanni Scarsi, all of Genoa, Italy

[73] Assignee: Italimpianti Societa Italiana Impianti p.a., Italy

[21] Appl. No.: 321,212

[22] Filed: Mar. 9, 1989

[30] Foreign Application Priority Data

Mar. 24, 1988 [IT] Italy .................. 12443 A/88

[51] Int. Cl.$^5$ .................................. B65G 43.08
[52] U.S. Cl. .......................... 198/341; 198/464.2; 250/223 R
[58] Field of Search .............. 198/394, 395, 464.2, 198/341; 250/223 R

[56] References Cited

U.S. PATENT DOCUMENTS

| | | | |
|---|---|---|---|
| 3,096,871 | 7/1963 | Anderson | 198/464.2 X |
| 3,109,391 | 11/1963 | Lefever | 414/196 |
| 3,242,342 | 3/1966 | Gabar | 198/464.2 X |
| 4,179,707 | 12/1979 | Sjödin | 250/223 R X |
| 4,188,544 | 2/1980 | Chasson | 250/223 R X |
| 4,228,886 | 10/1980 | Moran | 198/395 |
| 4,384,303 | 5/1983 | Brenke et al. | 250/223 R X |
| 4,435,837 | 3/1984 | Abernathy | 198/395 X |

FOREIGN PATENT DOCUMENTS

| | | | |
|---|---|---|---|
| 2499032 | 8/1982 | France | 198/395 |
| 0217418 | 9/1986 | Japan | 198/395 |
| 0273214 | 12/1986 | Japan | 198/395 |

*Primary Examiner*—D. Glenn Dayoan
*Attorney, Agent, or Firm*—Larson and Taylor

[57] ABSTRACT

This invention relates to a method of and apparatus for the positioning of thick slabs (2) to be introduced into a furnace, particularly into a walking-beam furnace, the positioning being effected with the aid of optical devices (5, 9, 10) and electronic devices (11, 12). By this method, at each lateral region opposite the furnace mouth (3), onto the upper surface of a slab (2) and at the region of its end faces (102, 102'), there are projected at least two blades of light (6, 7, 8) of a given length, which are normal to the direction of entrance and advance into the furnace and parallel to each other, the ends of which are perfectly aligned on a straight line which is parallel to the direction of entrance and advance into the furnace, the blades (6, 7, 8) producing parallel lines of light (106, 107, 108) on the surface of the slab (2), the lines being interrupted at the end edges (102, 102') of the slab. The deceleration of the slab transporting movement, and the stoppage thereof, is determined with the aid of electronic devices (11, 12) as a function of the length of the lines of light (106, 107, 108).

13 Claims, 4 Drawing Sheets

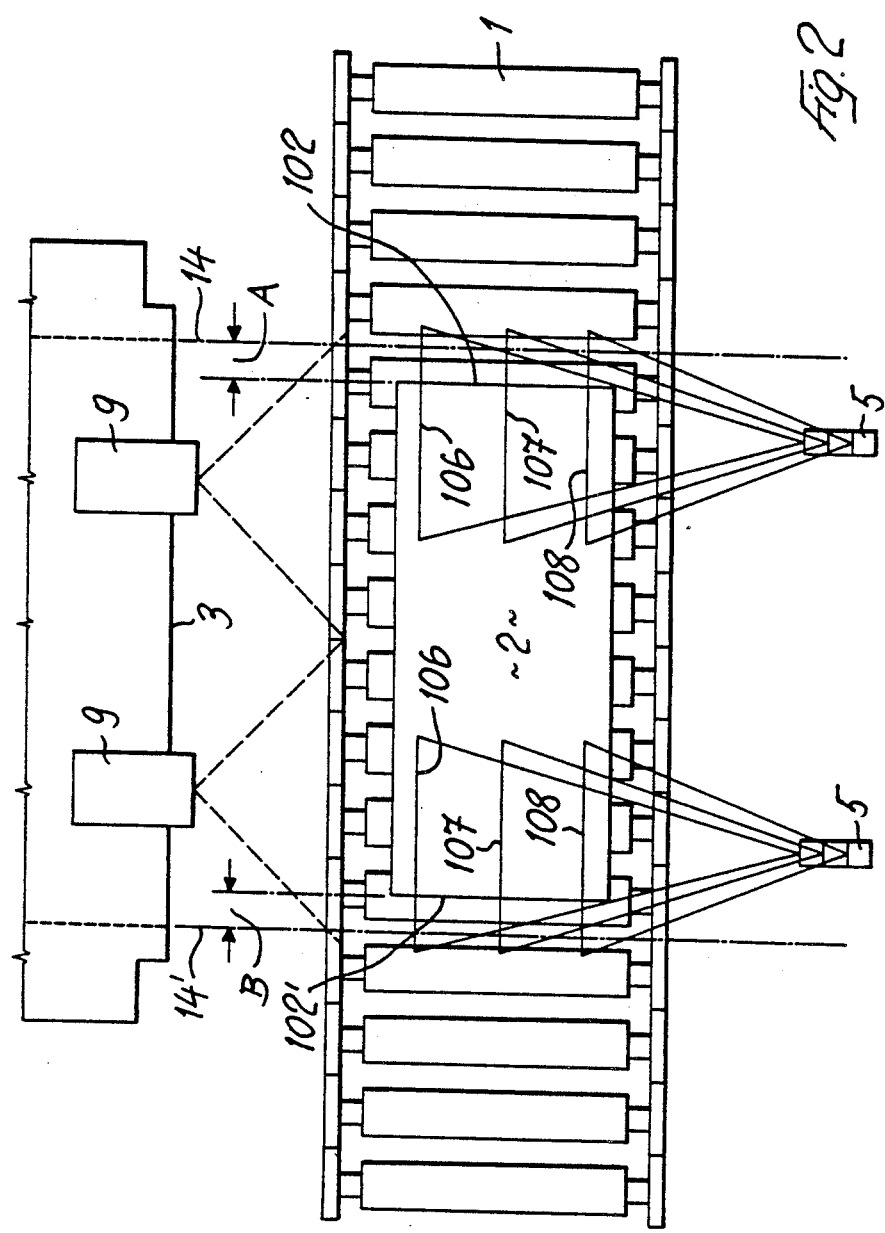

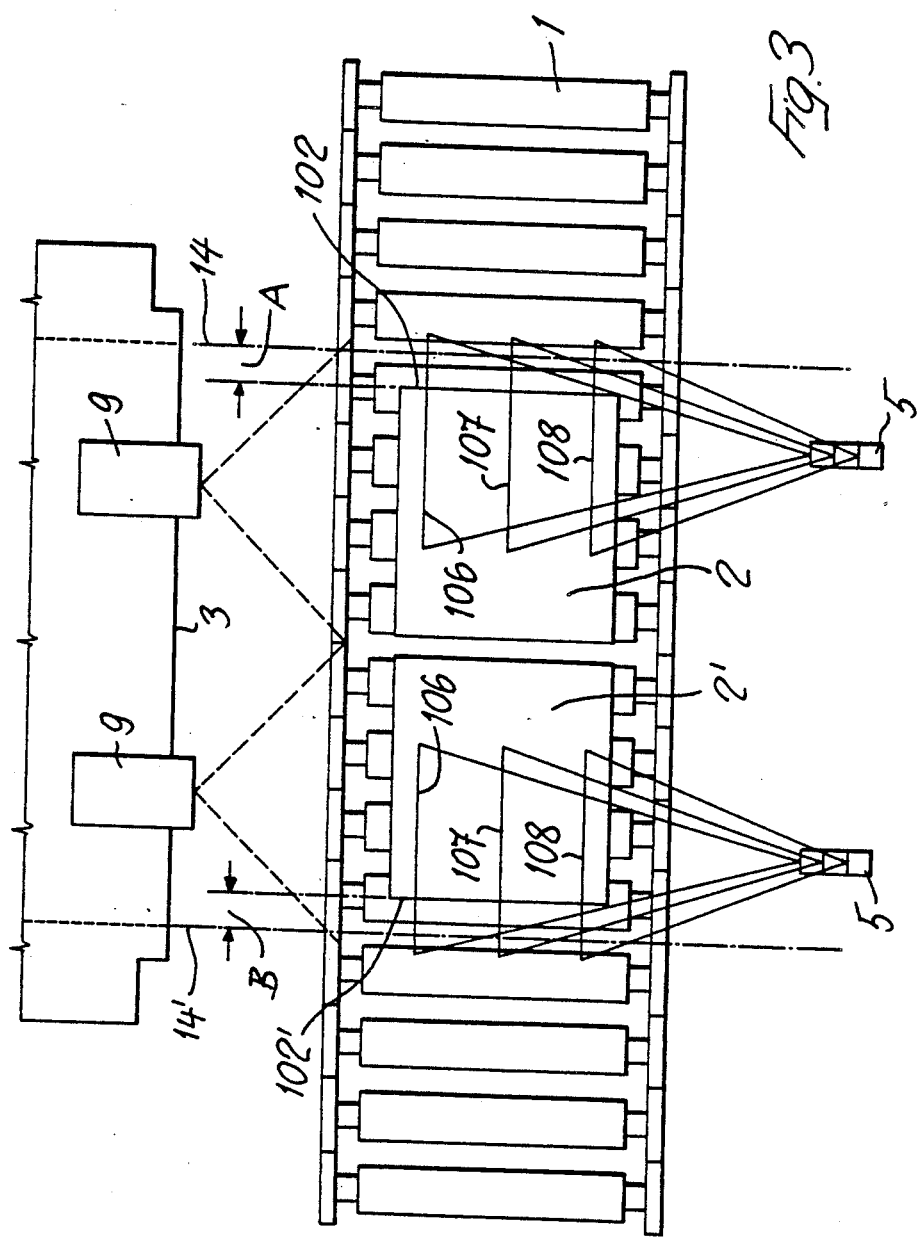

METHOD AND APPARATUS FOR THE POSITIONING OF SLABS

SUMMARY OF THE INVENTION

This invention relates to a method for the positioning of thick slabs to be introduced into a furnace, particularly into a walking-beam furnace, said slabs being fed normally to the direction of entrance into the furnace in front of the mouth thereof, the positioning of said slabs being effected by means of optical and electronic means. Moreover, the invention provides an apparatus to carry out said method, comprising a roller-path or the like to advance the slabs to the furnace-mouth normally to the direction of entrance and advance into the furnace in the area in front of the furnace-mouth, and a plurality of light sources directed against the slabs in the area of the furnace-mouth, and telecameras directed towards the area in front of the furnace-mouth and connected to visualizing monitors, and a micro-processor connected to said monitors.

Usually, slabs are fed to the area in front of the furnace-mouths, particularly walking-beam furnaces, normally to the direction of entrance and advance into the furnace and with the aid of a roller-path, or the like, and they are then introduced into the furnace by means of suitable furnace-feeding devices in the same positioning they have on said roller-path. In order to avoid any accident during the passage through the furnace, slabs should be introduced thereinto in the most suitable position, i.e. with their longitudinal axes normal to the direction of movement in the furnace, said direction being usually parallel to the longitudinal axis of the furnace, and with their intermediate transverse axes parallel to the longitudinal axis of the furnace, i.e. to the direction of entrance and advance into the furnace. Moreover, they should be centered perfectly with respect to the furnace-mouth. In case of small slabs which may be introduced into the furnace two by two, their longitudinal axes must coincide. Therefore, the introduction of slabs requires a positioning device which controls the roller-path so as to ensure a correct positioning of a slab with respect to the furnace-mouth.

A known method of slab positioning uses laser beams incident onto the end faces of the slabs, and the reflected image therof is detected by optical and electronic means, for example, by telecameras associated with display monitors and with an electronic processor. According to this known method, in order to determine the correct centered position of a slab with respect to the furnace-mouth, the angle of reflection of the laser beam on the end face of a slab is measured, which varies depending upon the different positions on said roller-path, or the like. Since the end face of slabs, against which the laser beam is projected, is often considerably irregular, said known method, while eliminating the disadvantage of the methods used heretofore, concerning the slipping of slabs on the rollers, has the disadvantage that, often, the beam may impinge against ridges or valleys of the end face of a slab, which is generally of rough formation, thus causing a displacement in the actual position of the slab. Moreover, by this method, it is impossible to determine possible orientation errors of a slab with respect to the direction of entrance and advance into the furnace.

The object of the present invention is to provide a method of and an apparatus for the positioning of thick slabs, of the type disclosed in the preamble and which eliminates the disadvantages mentioned above, permitting a correct and exact positioning of slabs with respect to the furnace-mouth by comparatively simple means and with a reduced capital cost.

The invention solves this problem by a method whereby, at each lateral region opposite the furnace-mouth, onto the upper surface of a slab and at the region of its end faces, there are projected at least two blades of light having a given length, which are normal to the direction of entrance and advance into the furnace and parallel to each other, the ends of which are perfectly aligned on a straight line which is parallel to the direction of entrance and advance into the furnace, said blades producing parallel lines of light on said surface of the slab, said lines being interrupted or offset at the end edges of said slab, and the distance of each end face of a slab, from the respective sidewall of the furnace-mouth is determined as a function of the length of said lines of light.

The deceleration of the movement of long slabs is controlled as a function of the difference of said distances of each end face from the respective sidewall of the furnace-mouth, and the slab is stopped when said difference is zero.

In case of two small slabs which are to be introduced into the furnace simultaneously and closely spaced from each other, we determine first the lengths of the two slabs and resulting distances of the end faces of each slab from the respectively nearer sidewall of the furnace-mouth, while said slabs are fed after each other, and the deceleration of each slab is controlled by the method described above depending upon the difference between the calculated value and measured value, to stop each slab when the respective difference is zero.

The perfectly aligned ends—on a straight line parallel to the direction of entrance and advance into the furnace—of the lines projected onto the upper surface of the slab, makes possible also the determination of a possible inclination of said slab with respect to said direction of entrance and advance into the furnace, as a function of the inclination of the straight line of alignment of said lines at the end edge.

In an apparatus of the type disclosed in the preamble for implementing the method of the invention there are provided at least two light sources arranged on the side of the roller-path or the like, which faces away from the furnace-mouth, each source projecting at least two blades of light normal to the direction of entrance and advance into the furnace onto one of the lateral regions opposite the furnace-mouth, and at least two telecameras directed towards the roller-path and arranged above the furnace-mouth, each of which is associated with one of the sides of the furnace-mouth and is connected to a display monitor, while the microprocessor is connected to the monitors and to an electronic, programmable-logic, control device to generate the control signal for the roller-path or the like.

Therefore, the invention has the advantage of permitting a perfect automatic positioning of slabs regardless of possible distortions, not only as for the centering thereof with respect to the furnace-mouth, but also for the orientation thereof with respect to the direction of entrance and advance into the furnace, even in the case of two short slabs to be simultaneously introduced into the furnace.

The invention also relates to further characteristics which further improve the method and the apparatus for the positioning of slabs as above and which are the objects of the sub-claims.

BRIEF DESCRIPTION OF THE DRAWINGS

The particular characteristics of the invention and the advantages resulting therefrom will become apparent with more detail from the description of a preferred embodiment thereof, shown as a non-limiting example in the accompanying drawings, wherein:

FIG. 2 and 3 are two top plan views of the apparatus according to the invention, the former with a long slab and the latter with two short slabs;

In the apparatus described below, it is assumed that the longitudinal axis of the furnace coincides with the direction of entrance and advance into said furnace.

DESCRIPTION OF THE PREFERRED EMBODIMENTS

Figure 1:
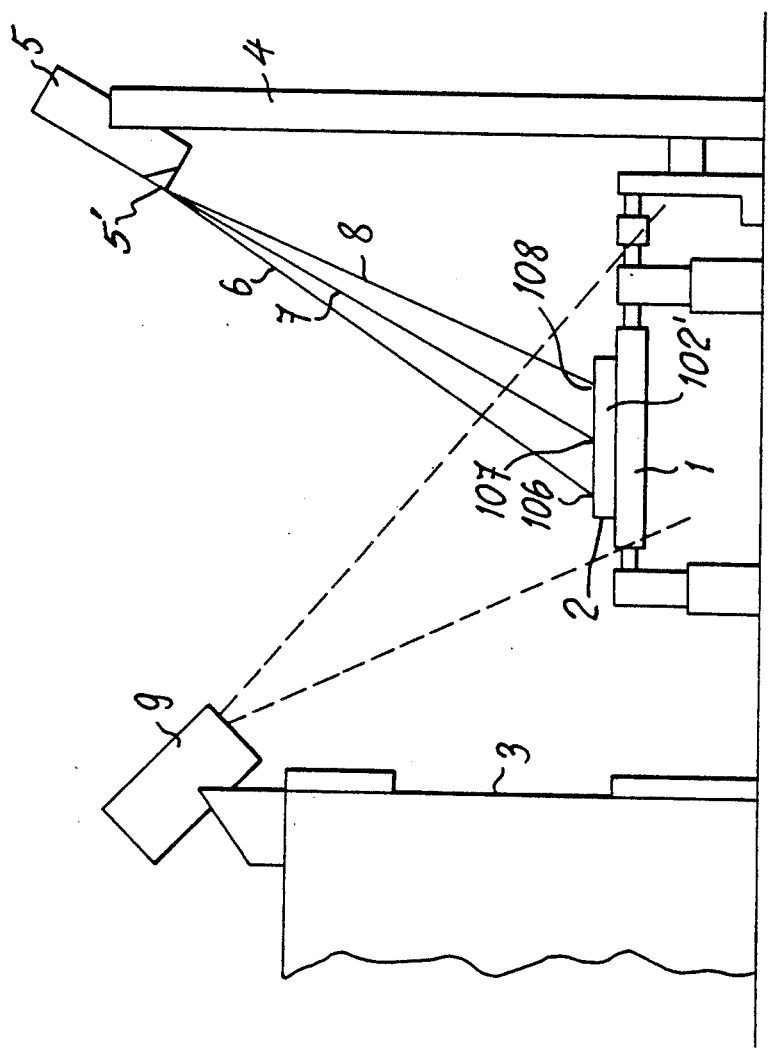
FIG. 1 is a side elevational view of an apparatus according to the invention.

FIG. 1 shows an apparatus according to the invention, comprising a plurality of individually driven rollers forming a powered roller-path 1 for feeding the slabs 2, said roller-path being arranged normally to the longitudinal axis of the furnace in front of the furnace-mouth 3. On the side of the roller-path 1 that faces away from the furnace-mouth 3, an upright structure 4 fixedly supports two sources of light indicated with the reference numeral 5 and arranged each opposite a lateral region of the furnace-mouth 3 and directed against the slab 2 disposed on the roller-path 1. The beams of the sources of light 5 are converted, with the aid of suitable optical devices 51, into three blades of light 6, 7, 8 disposed on three planes which are inclined to the horizontal plane and are so inclined to each other that their mutual intersection point coincides with the light source 5, while at least two or three parallel lines of light 106, 107, 108 are projected onto the slab 2. The light sources 5, moreover, are oriented so that the lines of light 106, 107, 108 created on the slab are normal to the direction of entrance and advance into the furnace, while their edges are perfectly aligned on a straight line which is parallel to the longitudinal axis of the furnace. On the side of the roller-path away from the sources of light 5 and above the top side of the furnace-mouth, opposite each lateral region, there is arranged a telecamera 9. Each telecamera 9 is directed towards the roller-path 1. The total field of vision of said telecameras 9, preferably, covers the entire stretch of roller-path 1 that is in front of the furnace-mouth 3. This arrangement is clearly apparent also from FIGS. 2 and 3.

Figure 4:
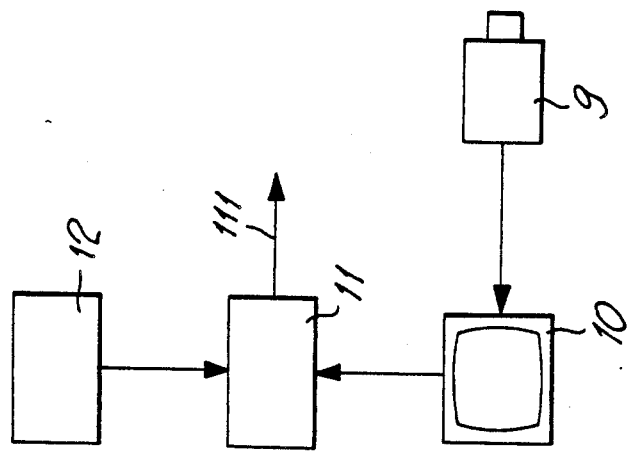
FIG. 4 is a block diagram of the electronic circuit of the apparatus according to the invention.

As clearly shown in FIG. 4, each telecamera 9 is connected first to a display monitor 10 which, in turn, is connected to a microprocessor 11. Said microprocessor, moreover, is connected to a programmable-logic control unit 12 which manages the handling of slabs. The microprocessor 11 has an outlet 111 to control the conveying speed of the powered roller-path 1.

Figure 5:
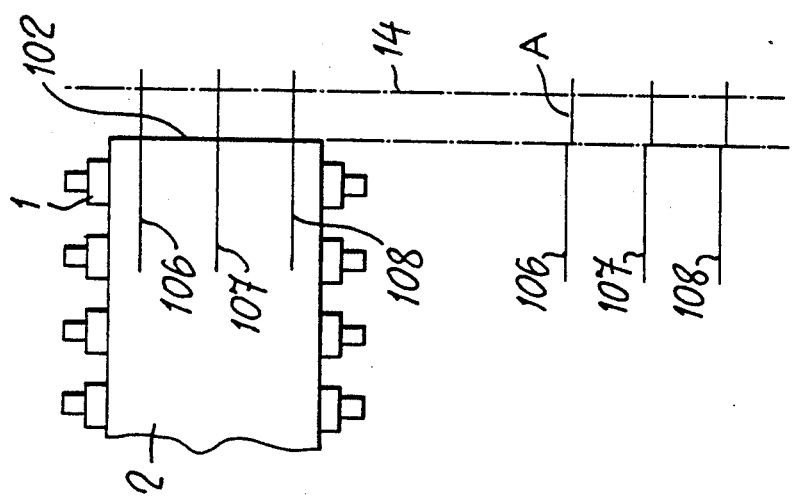

The image which is projected onto the slabs 2 is picked up by the telecameras 9 and is displayed on the monitors 10. FIG. 5 shows the image which is obtained when a slab 2 is oriented correctly with respect to the longitudinal axis of the furnace. In this instance, the end face 102 of the slab is perfectly aligned with the longitudinal axis of the furnace. The monitor 10, therefore, will show the three lines of light 106, 107, 108 being projected on the slab as spaced by a vertical offset from three associated lines corresponding to three reference lines or projections of the blades of light 6, 7, 8 onto the rollers adjacent the end face 102. The spots of spacing or offset are disposed, in this instance, on a straight line which is parallel to the longitudinal axis of the furnace, while the length of the lines of light 106, 107, 108 from their ends on the slab to the spots of offset at the edge of the end face 102 is identical for all the lines.

By virtue of the pair of reference borders 14 and 14' which, in this instance, are in register each with a sidewall of the furnace-mouth 3, on the basis of the length of these lines of light the distances A and B of the end faces 102 and 102' of a slab from the respective sidewall of the furnace mouth 3 can be determined, and, therefore, the automatic centering of the slab 2 with respect to the furnace-mouth 3 can be effected, by suitably controlling the speed of the roller-path 1. The deceleration of the roller-path 1 is controlled by the microprocessor 11 connected to the monitor 10 depending upon the difference of said two distances A and B of the respective end faces 102 and 102' of a slab 2 from the corresponding sidewalls of the furnace-mouth 3 registering with the reference border 14 and 14' whereby the deceleration is continuous and the slab 2 is stopped only when the distance A is identical to the distance B, i.e. when their difference is zero. In this instance, it is to be noted that the microprocessor will not initiate the control operation until the end face 102', that is the rear wall with respect to the feeding direction of the slab 2, has come into the reach of the blades of light 6, 7, 8, i.e. until it has overstepped the reference border 14' associated therewith, since only in this circumstance a definite value greater than zero exists for the distance B and the difference between the two distances A and B can be determined.

FIG. 3 shows the apparatus according to the invention in case of two shorter slabs 2, 2' to be introduced into the furnace simultaneously. In this instance, the distances A' and B' must be calculated previously, on the basis of the known lengths of the slabs 2, 2'. When the first slab, for example the slab 2, comes into the reach of the blades of light 6, 7, 8 in register with the sidewall of the furnace-mouth 3 associated therewith, the microprocessor commands the deceleration of the rollers, using as a reference parameter the difference between the measured value A and calculated value A' transmitted automatically by the control unit 12 to the microprocessor 11 or entered manually by the operator, and stopping the slab 2 when the two values are identical, i.e. when their difference is zero. The deceleration and stoppage command for the second slab 2' is initiated when the length of the lines 106, 107, 108 begins decreasing, since only then the slab 2' has overstepped the reference border 14' and its deceleration is similarly controlled depending upon the difference between the calculated distance and the measured distance, to come to a stop when such a difference is zero.

Figure 6:
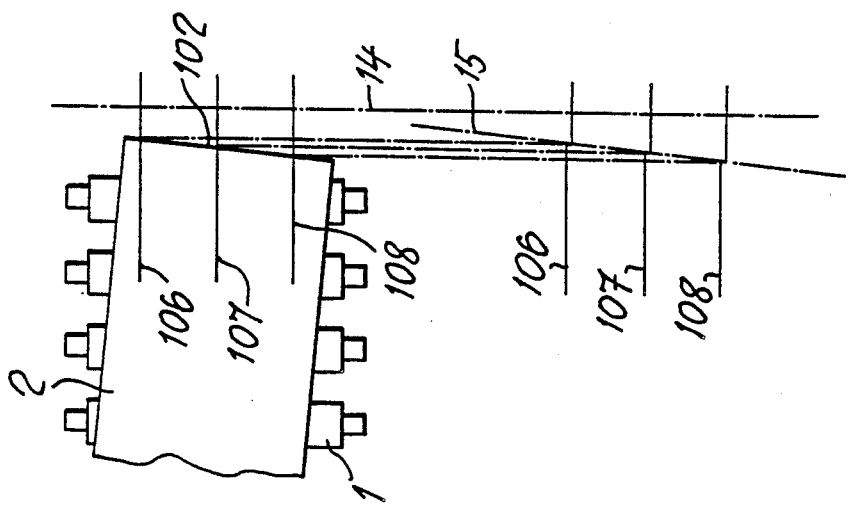
FIG. 5 and 6 show the images appearing on the monitor and corresponding to two different orientations of a slab.

Finally, as shown in FIG. 6, the method according to the invention may be used as well to determine the orientation of a slab with respect to the longitudinal axis of the furnace. In the case of FIG. 6, we have shown the end face of a slab 2 the longitudinal axis of which is not perfectly normal to the longitudinal axis of the furnace. In this circumstance, the end face 102 of the slab 2 is also inclined with respect to the longitudinal axis of the furnace, whereby the lines of light 106, 107, 108 have different lengths and show offset sections on a straight line 15 which is similarly inclined with respect to the longitudinal axis of the furnace. Therefore, by virtue of the microprocessor 11 connected to the monitor 10, it is possible to detemine the angle of inclination and control mechanical orientation means (not shown) and/or a warning device for the personnel intrusted with the manual correction.

The use of the monitors 10, and the fact that the total field of vision of the telecameras 9 covers the entire region in front of the furnace-mouth 3, enable additionally a direct visual check of said region by the personnel on duty.

In all the apparatuses according to the invention, the roller-path may be replaced with any other equivalent conveyor means.

We claim:

1. A method for positioning slabs for insertion into a walking beam furnace having a furnace-mouth, the slabs being fed on a conveyor normally to a direction of entrance and advance into the furnace in front of the furnace-mouth, comprising the steps of:
    projecting onto an upper surface and one end of a slab at each lateral region opposite sidewalls of the furnace-mouth at least two blades of light which are (a) of a given length, (b) normal to the direction of entrance and advance into the furnace (c) parallel to each other, and (d) provided with ends which are perfectly aligned on a straight line which is parallel to the direction of entrance and advance into the furnace, such that said blades of light produce parallel lines of light on the upper surface of the slab with the lines of light being defined by a discernible interruption spot at the end of the slab;
    determining a lateral distance of each end from the adjacent sidewall of the furnace-mouth derived from the length of each line of light on the slab; and
    controlling the deceleration and stoppage of the conveyor of the slabs so that the lateral distance of each end from the adjacent sidewall reaches a predetermined configuration.

2. A method for positioning as claimed in claim 1 wherein said determining step further determines a difference between the lengths of the lines at each lateral region and said controlling step stops the conveyor when the difference equals zero and hence the lateral distances of each end are of equal value.

3. A method for positioning as claimed in claim 1 wherein two short slabs of known length are to be introduced simultaneously as a pair into the furnace-mouth; and wherein said determining step first determines the lateral distance of an end of a downstream one of the slabs from a downstream lateral side and said controlling step decelerates and stops the downstream slab when the lateral distance thereof reaches the predetermined configuration, and then said determining step determines the lateral distance of an end of an upstream one of the slabs from an upstream lateral side and said controlling step decelerates and stops the upstream slab when the lateral distance thereof reaches the predetermined configuration.

4. A method for positioning as claimed in claim 1 wherein said controlling step includes the entering of the predetermined configuration in a microprocessor which controls the conveyor.

5. A method for positioning as claimed in claim 1 wherein said controlling step includes the calculating of the predetermined configuration in a programmable logic control unit of a microprocessor which controls the conveyor.

6. A method for positioning as claimed in claim 1 wherein reference borders are provided at each lateral region, and wherein said determining step includes the determining of a distance of the adjacent end to an adjacent reference border based on the length of the adjacent lines of light.

7. A method for positioning as claimed in claim 6 wherein the reference borders are in register with an adjacent sidewall.

8. A method for positioning as claimed in claim 1 and further including the step of determining an inclination of the end of the slab with respect to the direction of entrance and advance by comparing the lengths of adjacent lines.

9. An apparatus for positioning slabs for insertion into a walking beam furnace having a furnace-mouth comprising:
    a roller path for feeding the slabs in front of the furnace-mouth, said roller path having a direction of movement perpendicular to a direction of entrance and advance into the furnace;
    at least two sources of light arranged on a side of said roller path away from said furnace-mouth and directed respectively toward a region of said roller path opposite a respective sidewall of the furnace-mouth, each said source of light projecting on a slab located on said roller path at least two blades of light which blades of light are normal to the direction of entrance and advance into the furnace and which produce lines of light which lines of light include a discernible interruption spot where the line of light intersects an adjacent end of the slab;
    at least two telecameras directed toward and associated with respective said regions of said roller path and arranged above the furnace-mouth;
    display monitors to which respective said telecameras are connected;
    a microprocessor means for controlling said roller path to decelerate and stop the slab in front of the furnace-mouth, said microprocessor means being connected to said monitors to determine the length of each line of light on the slab and hence to determine a lateral distance of each end from the adjacent sidewall so that the slab is positioned in a predetermined configuration; and
    a programmable-logic electronic control unit by which the predetermined configuration is inputted to said microprocessor means.

10. An apparatus for positioning slabs as claimed in claim 9 wherein each said source of light includes a source of a luminous beam and an optical device which converts the beam to the at least two blades of light.

11. An apparatus for positioning slabs as claimed in claim 9 wherein said regions of said roller path to which said telecameras are directed comprise all of a portion of said roller path in front of the furnace-mouth.

12. An apparatus for positioning slabs as claimed in claim 9 wherein each said source of light projects three blades of light each of which is projected in a respective plane inclined to a horizontal plane and with intersection lines of said projected planes with the horizontal plane being parallel to each other.

13. An apparatus for positioning slabs as claimed in claim 9 wherein said microprocessor means also determines an inclination of the end of the slab with respect to the direction of entrance and advance by comparing the lengths of adjacent said lines.

* * * * *